US010727972B2

(12) United States Patent
Badar et al.

(10) Patent No.: US 10,727,972 B2
(45) Date of Patent: Jul. 28, 2020

(54) PASSIVE OPTICAL NETWORK DISTRIBUTION SYSTEMS AND COMPONENTS THEREOF

(71) Applicant: CommScope Technologies LLC, Hickory, NC (US)

(72) Inventors: Timothy G. Badar, Redwood City, CA (US); Erik Gronvall, Bloomington, MN (US); Kristofer Bolster, Jordan, MN (US); Thomas G. LeBlanc, Westminster, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/298,564

(22) Filed: Mar. 11, 2019

(65) Prior Publication Data
US 2019/0393975 A1 Dec. 26, 2019

Related U.S. Application Data

(63) Continuation of application No. 15/443,851, filed on Feb. 27, 2017, now Pat. No. 10,230,484, which is a
(Continued)

(51) Int. Cl.
*H04J 14/02* (2006.01)
(52) U.S. Cl.
CPC ................ *H04J 14/0245* (2013.01)
(58) Field of Classification Search
CPC .............. H04J 14/0245; H04J 14/0239; H04J 14/0246; H04J 14/0249; H04J 14/0252; H04J 14/0253
(Continued)

(56) References Cited

U.S. PATENT DOCUMENTS 9,584,248 B2 * 2/2017 Badar ................ H04J 14/0245
10,230,484 B2 * 3/2019 Badar ................ H04J 14/0245
(Continued)

FOREIGN PATENT DOCUMENTS

KR 10-2013-0084943 7/2013

OTHER PUBLICATIONS

International Search Report and Written Opinion for Application No. PCT/US2015/018360 dated May 27, 2015.

*Primary Examiner* — Dalzid E Singh
(74) *Attorney, Agent, or Firm* — Merchant & Gould P.C.

(57) ABSTRACT

Systems and methods for delivering multiple passive optical network services are disclosed. One system includes a first optical transmission service comprising a common wavelength pair routed from a source to each of a plurality of subscribers and a second optical transmission service comprising a plurality of unique wavelength pairs, each of the unique wavelength pairs assigned to a subscriber among the plurality of subscribers. The system includes a splitter optically connected to first fiber carrying the first optical transmission service, the splitter including a plurality of outputs each delivering the first optical transmission service, and a wavelength division multiplexer connected to a second fiber, the wavelength division multiplexer separating each of the unique wavelength pairs of the second optical transmission service onto separate optical fibers. The system further includes a plurality of second wavelength division multiplexers optically connected to a different output of the plurality of outputs of the splitter and to a different one of the unique wavelength pairs from the wavelength division multiplexer, thereby combining a unique wavelength pair and a common wavelength pair onto a single fiber to be delivered to a subscriber.

17 Claims, 13 Drawing Sheets

Related U.S. Application Data continuation of application No. 14/636,497, filed on Mar. 3, 2015, now Pat. No. 9,584,248.

(60) Provisional application No. 61/947,210, filed on Mar. 3, 2014.

(58) Field of Classification Search
USPC .......................................................... 398/79
See application file for complete search history.

(56) References Cited

U.S. PATENT DOCUMENTS

| | | |
|---|---|---|
| 2003/0072052 A1 | 4/2003 | Graves et al. |
| 2006/0146855 A1 | 7/2006 | Kani et al. |
| 2007/0183779 A1 | 8/2007 | Bouda et al. |
| 2007/0230957 A1 | 10/2007 | Ozaki |
| 2008/0232743 A1* | 9/2008 | Gronvall ............... G02B 6/3897 385/77 |
| 2009/0220231 A1 | 9/2009 | Zimmel et al. |
| 2010/0086260 A1* | 4/2010 | Parikh ................... G02B 6/4442 385/76 |
| 2011/0158650 A1* | 6/2011 | Cavaliere ............ H04J 14/0226 398/79 |
| 2013/0183039 A1 | 7/2013 | Hood et al. |
| 2015/0341137 A1* | 11/2015 | Kaneko ................ H04B 10/272 398/67 |

\* cited by examiner

PASSIVE OPTICAL NETWORK DISTRIBUTION SYSTEMS AND COMPONENTS THEREOF

CROSS-REFERENCE TO RELATED APPLICATIONS

This application is a continuation of application Ser. No. 15/443,851, filed Feb. 27, 2017, which is a continuation of application Ser. No. 14/636,497, filed Mar. 3, 2015, now U.S. Pat. No. 9,584,248, which application claims the benefit of provisional application Ser. No. 61/947,210, filed Mar. 3, 2014, which applications are incorporated herein by reference in their entirety.

TECHNICAL FIELD

The present application relates generally to distribution of passive optical network services, and in particular to passive optical network distribution systems and components thereof.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and cost and may increase network reliability.

Passive optical networks may take one or more signals from incoming fiber(s) and make it available to a number of output fibers. For example, a distribution cable may include 24 optical fibers and may run from a central office to a distribution location, such as an equipment enclosure. At the equipment enclosure, each fiber in the distribution cable may be split into a number of outgoing fibers which are made available to subscribers. For example, passive optical networks may employ 1:2, 1:4, 1:8, 1:16 and 1:32 splitting ratios for each fiber, for making optical data available to subscriber locations.

In a traditional gigabit passive optical network, a single transmit wavelength and a single receive wavelength are used in each 1:32 split, requiring 32 subscribers to share bandwidth on a single fiber. However, in other systems, such as WDM systems, dedicated wavelengths are used for each subscriber. Conversion between gigabit and WDM systems requires substantial reconfiguration of the optical network to take advantage of the dedicated wavelength system. In certain instances, replacing wires leading to subscriber locations would be required. Such re-cabling is costly and time-consuming.

For these and other reasons, improvements are desirable.

SUMMARY

In accordance with the following disclosure, the above and other issues are addressed by the following: In a first aspect, a system for delivering multiple passive optical network services is disclosed. One system includes a first optical transmission service comprising a common wavelength pair routed from a source to each of a plurality of subscribers and a second optical transmission service comprising a plurality of unique wavelength pairs, each of the unique wavelength pairs assigned to a subscriber among the plurality of subscribers. The system includes a splitter optically connected to first fiber carrying the first optical transmission service, the splitter including a plurality of outputs each delivering the first optical transmission service, and a wavelength division multiplexer connected to a second fiber, the wavelength division multiplexer separating each of the unique wavelength pairs of the second optical transmission service onto separate optical fibers. The system further includes a plurality of second wavelength division multiplexers optically connected to a different output of the plurality of outputs of the splitter and to a different one of the unique wavelength pairs from the wavelength division multiplexer, thereby combining a unique wavelength pair and a common wavelength pair onto a single fiber to be delivered to a subscriber. The system further includes a band-pass filter receiving the single fiber including the unique wavelength pair and the common wavelength pair, the band-pass filter delivering one of the unique wavelength pair and the common wavelength pair to the subscriber.

In a second aspect, a system for delivering multiple passive optical network services includes a first optical transmission service and a second optical transmission service received on a common fiber, the first optical transmission service comprising a common wavelength pair routed from a source to each of a plurality of subscribers and the second optical transmission service comprising a plurality of unique wavelength pairs, each of the unique wavelength pairs assigned to a subscriber among the plurality of subscribers. The system further includes a splitter positioned at a terminal optically connected between a central office and a subscriber, the splitter configured to receive the single fiber and output a plurality of optical connections passing the common wavelength pair and each of the plurality of unique wavelength pairs to each of a plurality of subscribers. The system also includes a filter at each of a plurality of subscribers, the filter selected to deliver either the common wavelength pair or one of the plurality of unique wavelength pairs to the subscriber associated with the filter.

In a third aspect, an optical termination enclosure is located between a signal distribution source and a plurality of subscribers. The optical termination enclosure includes a splitter optically connected to a first fiber carrying a first optical transmission service comprising a common wavelength pair to be routed from the source to each of the plurality of subscribers, the splitter including a plurality of outputs each configured to deliver the first optical transmission service through hardened multi-fiber optical connectors of the optical termination enclosure. The enclosure further includes a wavelength division multiplexer connected to a second fiber carrying a second optical transmission service comprising a plurality of unique wavelength pairs, each of the unique wavelength pairs to be assigned to a subscriber among the plurality of subscribers, wherein the wavelength division multiplexer is configured to separate each of the unique wavelength pairs of the second optical transmission service onto separate optical fibers which are output from the optical termination enclosure through hardened multi-fiber optical connectors.

DETAILED DESCRIPTION

Figure 1:
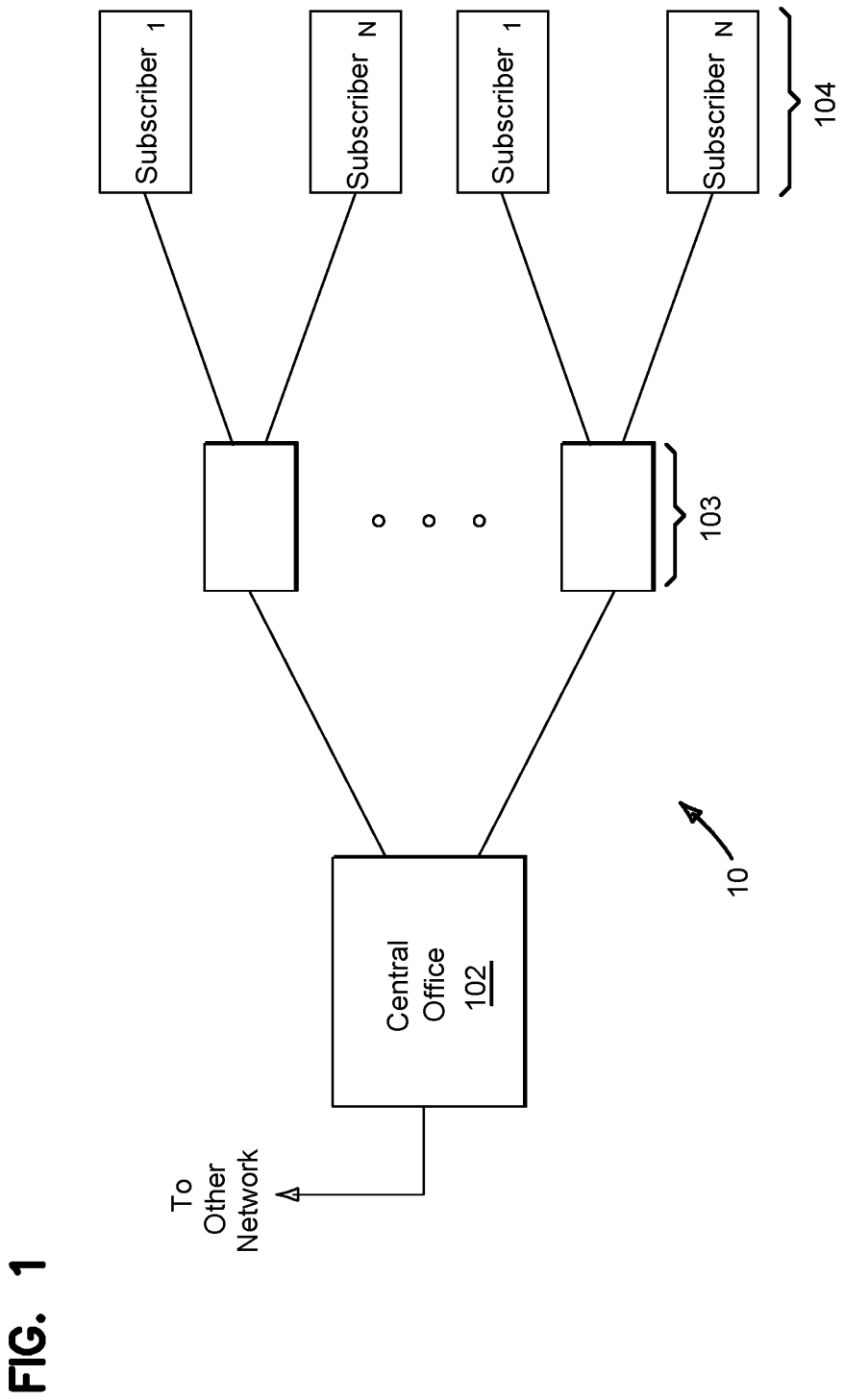
FIG. 1 is a schematic view of a system for delivery of multiple passive optical network services, according to one embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to delivery of one or more selectable passive optical network services to a single endpoint, such as a household, a business, or other entity requiring a telecommunications connection to a distribution hub. The present disclosure describes a variety of passive optical network configurations which allow for selective use of one or more of the passive optical network services, thereby allowing selective upgrading of endpoints based on customer desires or requirements. The methods and systems of the present disclosure allow use of the same optical fibers already deployed to customer homes.

The present disclosure is designed to enable providers of data/video/voice services who have currently deployed fiber-to-the-premise (FTTP) distribution networks for those services, be able to upgrade customers to higher data rate & bandwidth service(s) while maintaining the other services in their current delivery format. For example, a service provider may upgrade its data service to deliver individual customers with a dedicated 1 Gbps or 10 Gbps data line via a DWDM passive optical network (DWDM PON) while continuing to deliver voice and video to that same customer on its traditional gigabit PON (GPON). However, both would be delivered to the customer premise on the same already installed fiber. In this example, the service provider would not have to upgrade all of its delivery equipment to work with the new DWDM PON system but can use the fiber network that is already deployed in the field to deliver all of these services. Additionally, the present disclosure allows for switchover of individual customers from a GPON network to a WDM-based PON network, thereby providing a dedicated service (e.g., 1 Gbps or 10 Gbps service) to that customer rather than requiring the customer to connect via a time-shared optical network with other subscribers, thereby reducing the effective bandwidth available to that subscriber.

Referring now to FIG. 1, a generalized network in which aspects of the methods and systems of the present disclosure may be implemented. The network 10 as shown is a passive optical network (PON) such as can contain various fiber-to-the-premise (FTTP) systems. The network 10 connects a source 102, such as a central office of a telecommunications provider, to various subscribers 104, allowing the subscribers high speed data communications to other subscribers within the network and outside of the network (through other communication channels of the source). The network 10 includes a number of fiber optic components 103 that allow the network to route specific fiber optic signals to a subset of the entire subscriber base, thereby allowing the central office 102 to manage bandwidth concerns. The components can include, for example, splices, splitters, wavelength division multiplexers, repeaters, filters, and other optical components. These components may be modularly added or removed from the fiber optic system, such as by placing various combinations of such equipment in a fiber distribution hub or other modularly extensible system. The systems of the present disclosure breakout multifiber cable down to single fiber, limited wavelength spectra to allow a small number of users to share a particular available bandwidth. For example, in the case of gigabit PON, 32 subscribers 104 typically share a single wavelength for transmitting and receiving data with the source 102. In the case of a WDM-based PON, each subscriber has a dedicated wavelength pair which it uses to communicate with the source 102, thereby effectively increasing the bandwidth to that subscriber as compared to gigabit PON by eliminating competing traffic using that subscriber's communication wavelength.

Referring now to FIGS. 2-10, various systems for delivery of multiple passive optical network services are shown. These systems can be located within the network 10 of FIG. 1, and provide at least a portion of the connecting optical components used to connect a source 102 to subscribers 104.

Figure 2:
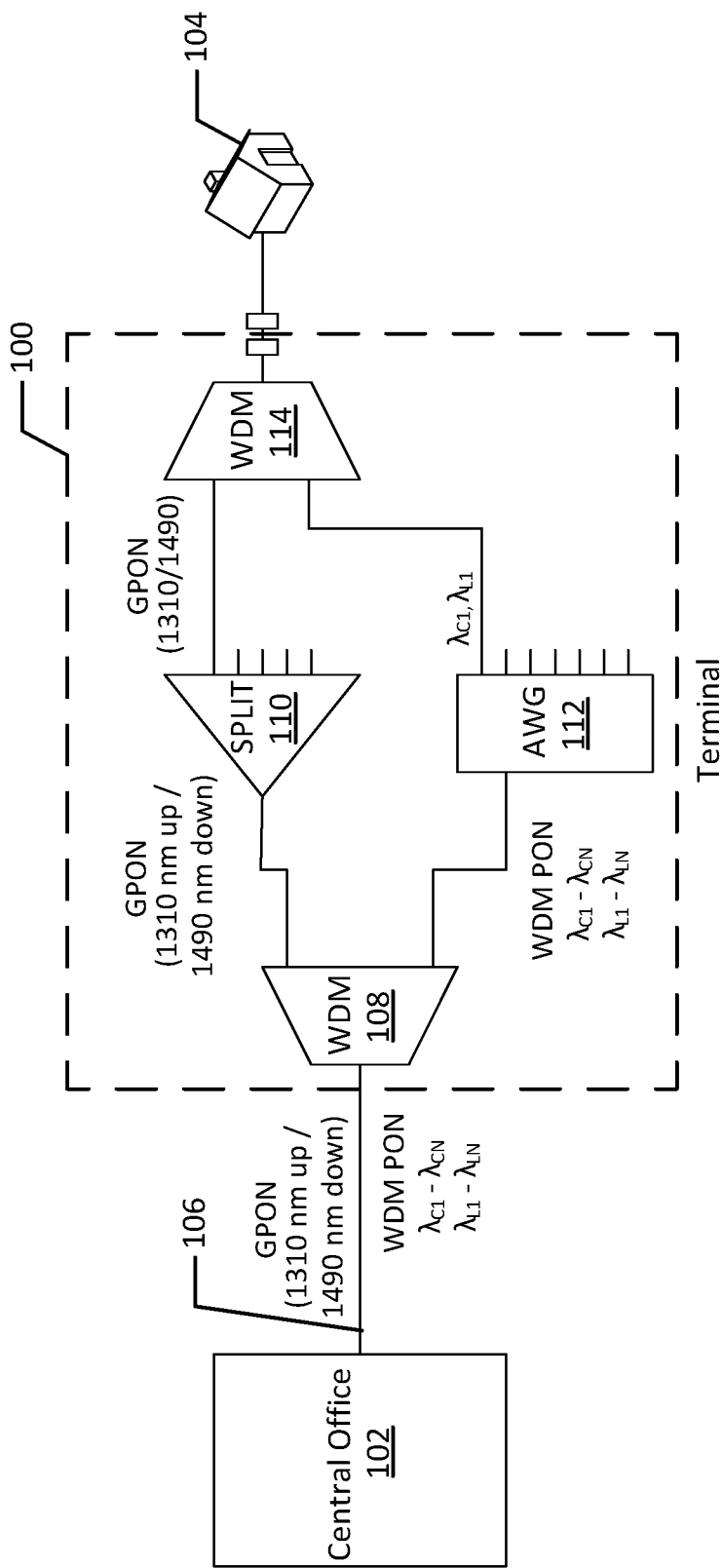
FIG. 2 shows a schematic view of a system for configurable delivery of passive optical network services, according to one embodiment of the present disclosure.

Referring now to FIG. 2, a schematic view of a system 100 for delivery of multiple passive optical network services is shown, according to one embodiment of the present disclosure. The system 100 connects optical fibers from a source 102, shown as a central office or OLT, to one or more subscribers 104, shown as customers or ONT connections. The system receives an initial distribution fiber 106 leading from the source 102, on which all spectra of optical transmission coexist. That initial distribution fiber 106 can include, for example, both GPON services (e.g., operating on 1310 nm uplink and 1490 downlink optical frequencies) as well as a spectrum useable for WDM-based PON distribution. At the system 100, which can be implemented at a terminal or other location between a central office 102 and subscribers 104*a-n*, the fiber 106 is received at a wavelength division multiplexer 108, which separates the GPON service wavelengths from the WDM-based PON wavelengths. The GPON wavelengths are routed to a splitter 110, which power-splits the GPON signal up to 32 or more ways (one per subscriber). The WDM-based PON wavelengths are routed to a cyclic arrayed waveguide grating (AWG) 112 that operates as a WDM to split uplink and downlink wavelengths ($\lambda_C$, $\lambda_L$, respectively) onto separate fibers. Those separate fibers can then be routed to a 2:1 WDM 114 which combines one WDM wavelength pair with one output from the splitter 110, to provide an output of the system 100 a combined GPON and WDM-PON signal. That signal can then be selectively connected to a subscriber 104, as shown.

Generally, in the configuration shown in FIG. 2, a single fiber is disposed between the central office 102 and the system 100 (e.g., the terminal). This fiber will carry combined GPON and C-band/L-band WDM-PON services, with 32 C-Band and 32 L-Band wavelengths used. The terminal will, in this embodiment, include 35 or more optical components, with WDM 108, splitter 110, AWG 112, and 32 separate 2:1 WDMs 114. This allows for delivery of a single fiber to a subscriber 104, with no need to change any connections at the terminal when transferring between GPON and WDM-PON services; only a change to an end unit is contemplated, as illustrated in FIGS. 4A-4B and 5A-5B, described below.

Additionally, it is noted that the loss levels at the system 100 will typically be expected to be about 7-8 dB on the WDM-PON signals, due to passage through WDMs 108, 114, as well as AWG 112. By way of contrast, loss on the GPON signals may be on the level of 18-20 dB, due to the power split component of splitter 110.

Figure 3:
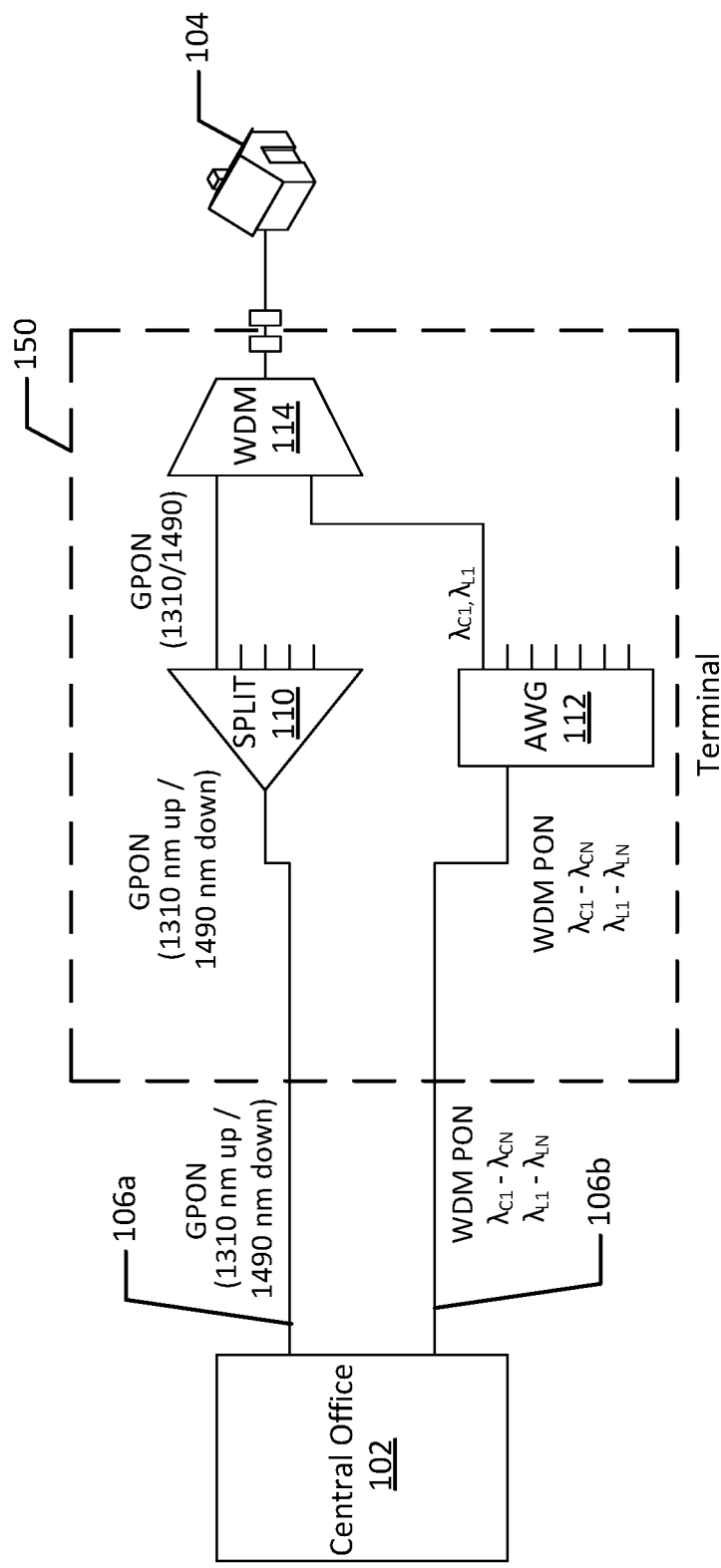
FIG. 3 shows a schematic view of a system for configurable delivery of passive optical network services, according to a second embodiment of the present disclosure.

Referring now to FIG. 3, an alternative configuration for a system 150 is shown. System 150 generally corresponds to system 100 of FIG. 2, but rather than using a single fiber 106 between the central office, separate fibers 106*a-b* are used for the GPON and WDM-PON services, respectively. This eliminates the WDM 108 at the system 150, thereby simplifying and cost-reducing that terminal implementation, and reducing the loss involved (while trading off the requirement of an additional fiber between the central office 102 and the system 150).

Figure 4A:
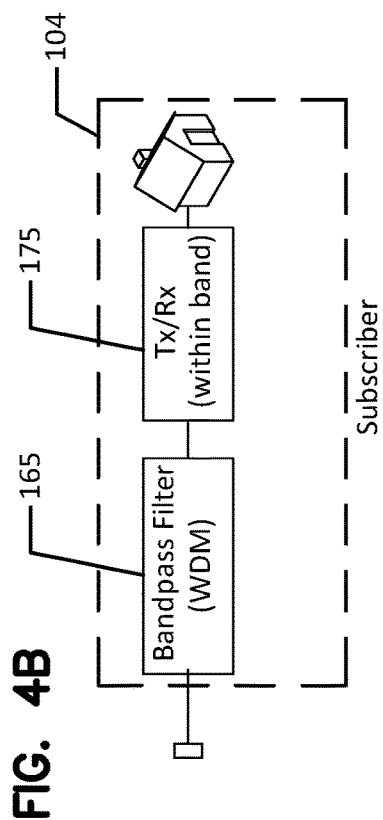
FIGS. 4A-4B show schematic views of subscriber equipment useable with the systems of FIGS. 2-3, according to one example embodiment of the present disclosure.
Figure 4B:
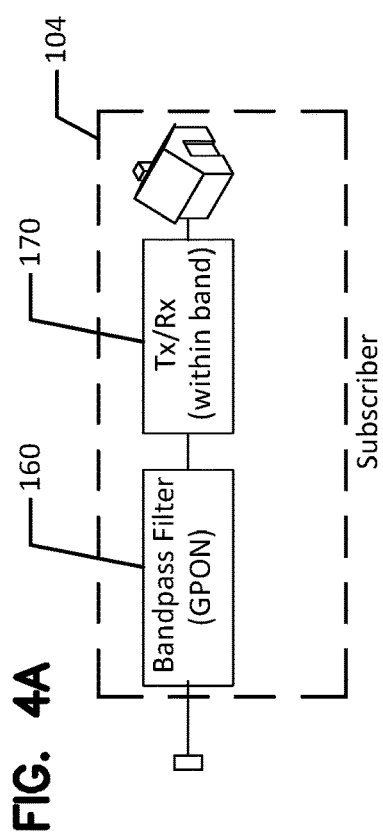

Referring to FIGS. 4A-4B, an example implementation of equipment used at a subscriber 104 is shown, and which allows for transitioning between GPON and WDM-PON services. FIGS. 4A-4B illustrate an arrangement in which a subscriber receives an input fiber connection which may include signals at both GPON and WDM-PON wavelengths. When the subscriber is registered for GPON services, that subscriber may utilize the configuration in FIG. 4A in which a filter 160 receives signals and filters the WDM-PON signals, passing GPON signals to a home unit. Similarly, the system can include a transmitter/receiver 170 that is configured to transmit and receive at GPON wavelengths (e.g., 1310/1490 nm).

When converting to WDM-PON, a subscriber will generally substitute that equipment for new equipment that includes a filter 165 tailored to the wavelengths selected for that subscriber, and a transmitter/receiver 175 that also falls within that band. In some embodiments, the selected wavelengths are close together (e.g., do not have intervening used wavelengths) such that a band-pass filter allows passage of both uplink and downlink (transmit and receive) wavelengths, while blocking wavelengths dedicated to other subscribers or which are used for GPON.

Figure 5A:
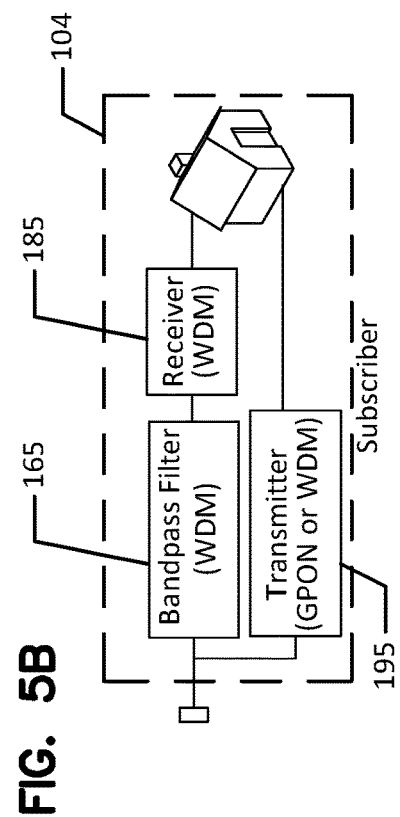
FIGS. 5A-5B show schematic views of subscriber equipment useable with the systems of FIGS. 2-3, according to one example embodiment of the present disclosure.
Figure 5B:
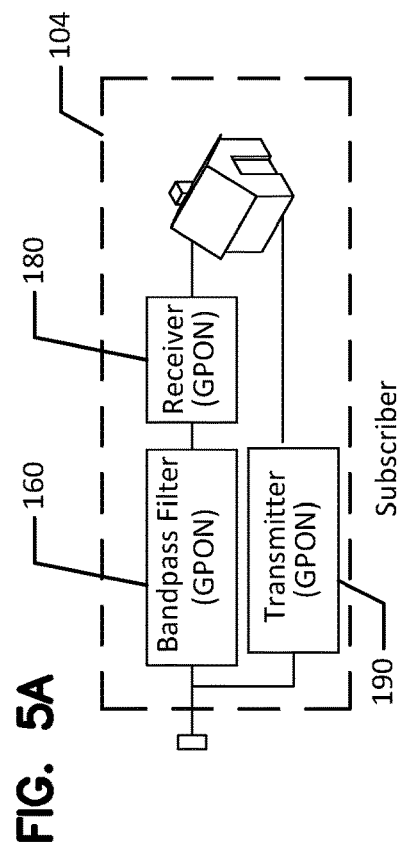

FIGS. 5A-5B illustrate an alternative configuration for equipment used at a subscriber 104 for transitioning between GPON and WDM-PON services. In this embodiment, rather than using a transmitter and receiver within a particular band passable by filter 160, a transmitter 190 can be configured to transmit either of GPON or WDM-PON services. As such, in some cases a subscriber could be allocated dedicated uplink wavelength and downlink wavelength, or only a dedicated downlink wavelength in alternative embodiments. In particular, as shown in FIG. 5A, a receiver 180 and transmitter 190 are configured for use at GPON wavelengths (1310 nm uplink and 1490 nm wavelength downlink). In FIG. 5B, a receiver 185 can be tuned to a particular WDM frequency, and a transmitter 195 can either be within a band matched to filter 165 (which also encompasses the receiver 185), or can be configured to transmit on some other frequency, for example a return dedicated wavelength for WDM-PON or a GPON wavelength.

In alternative embodiments beyond those described in connection with FIGS. 4A-4B and 5A-5B, other arrangements can be used at subscriber premises for selecting from between GPON and WDM-PON services. For example, in some cases, different filters can be used for uplink and downlink wavelengths, and a transmitter from the subscriber may be tunable to a desirable uplink wavelength to avoid the requirement of replacing subscriber systems when switching from GPON to WDM-PON. In still further arrangements, a subscriber may be switched from GPON to WDM-PON for only downlink wavelengths, and may have a shared uplink wavelength on the GPON service if both services are delivered to that subscriber concurrently. Such arrangements could be enabled by different combinations of filters and selected transmission systems at the subscriber used for generating uplink signals having one or more predetermined wavelengths. In a still further example embodiment, a white light transmitter could be paired with a filter either preconfigured to pass L-band (uplink) wavelengths or that is configurable to pass tunable uplink wavelengths back to the terminal (e.g., terminals 100, 150, or those discussed below) to the central office 102.

Figure 6:
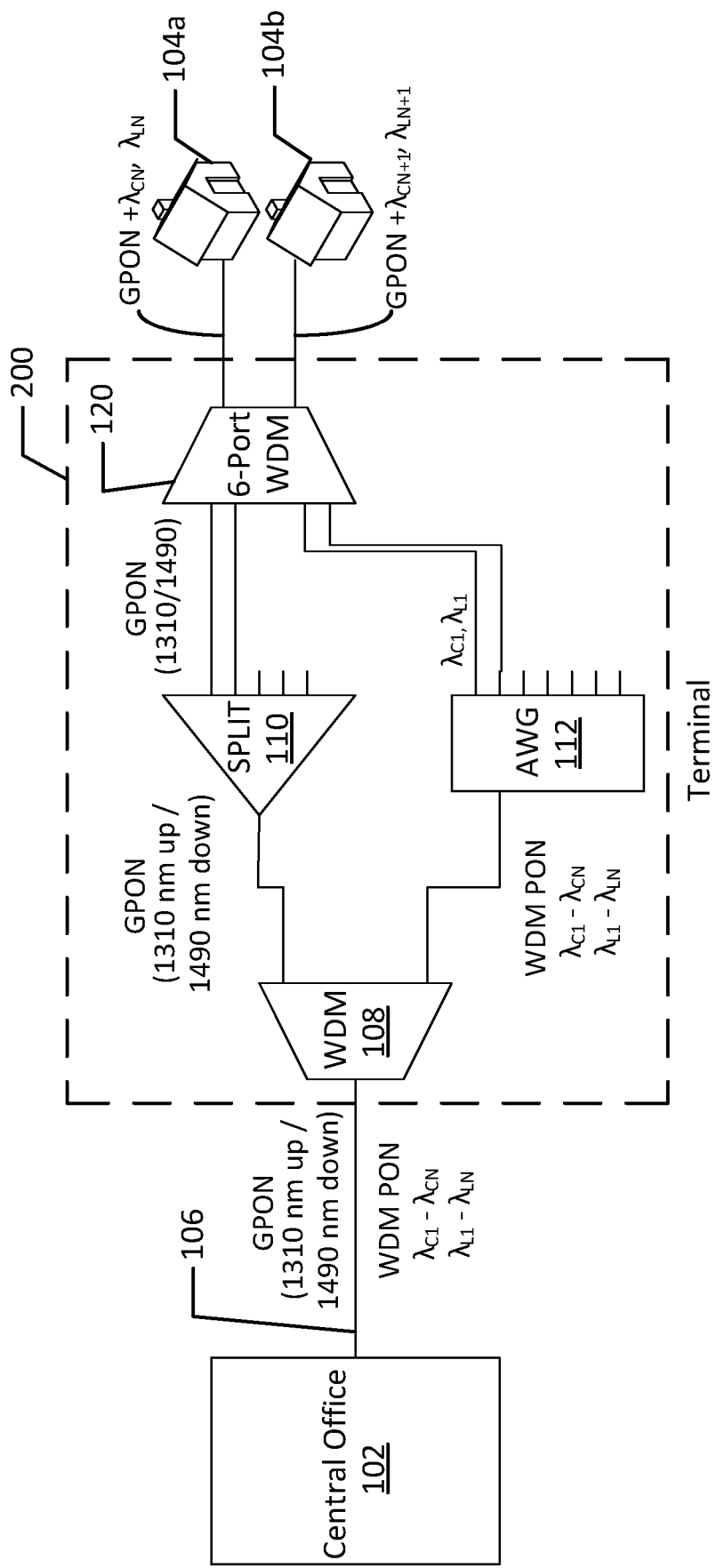
FIG. 6 shows a schematic view of a system for configurable delivery of selectable passive optical network services, according to a further embodiment of the present disclosure.
Figure 7:
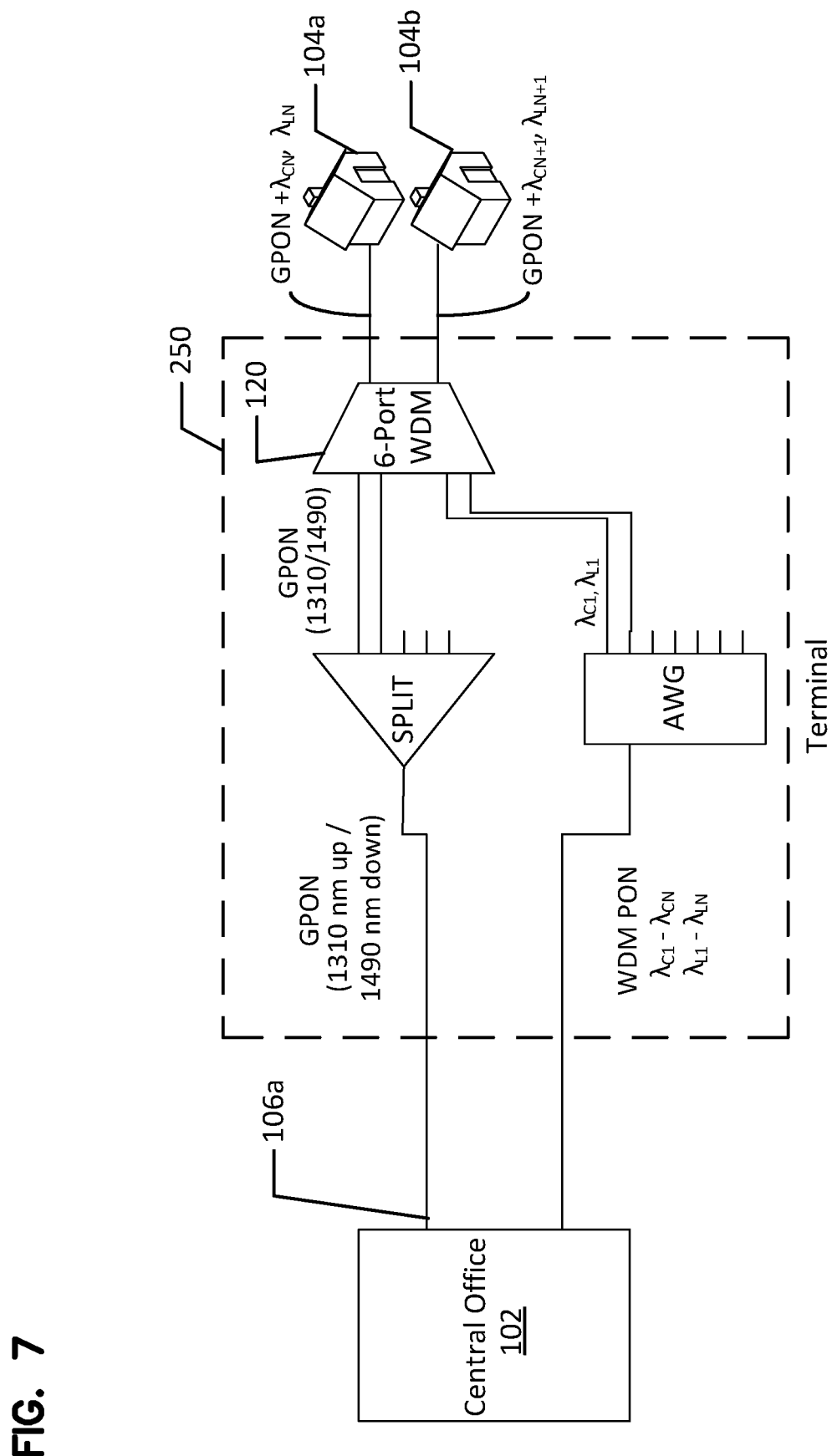
FIG. 7 shows a schematic view of a system for configurable delivery of selectable passive optical network services, according to a further embodiment of the present disclosure.

FIG. 6-7 illustrate further arrangements of a system for configurable delivery of passive optical network services, according to further embodiments of the present disclosure. In general, FIG. 6 illustrates a system 200 in which, rather than using a WDM 114 to route both GPON and WDM-PON signals to a subscriber 104, a 6-port WDM 120 can be used, which can combine GPON signals with multiple wavelengths output from AWG 112. As such, a number of WDMs is reduced, thereby cost-reducing the overall system 200. In particular, rather than using 35 passive components in system 100, system 200 utilizes 19 components.

FIG. 7 illustrates an analogous variant of FIG. 6 as is shown in FIG. 3 relative to FIG. 2; that is, in FIG. 7, two input fibers 106*a-b* are used and routed to system 250, which eliminates WDM 108 from that system.

Figure 8:
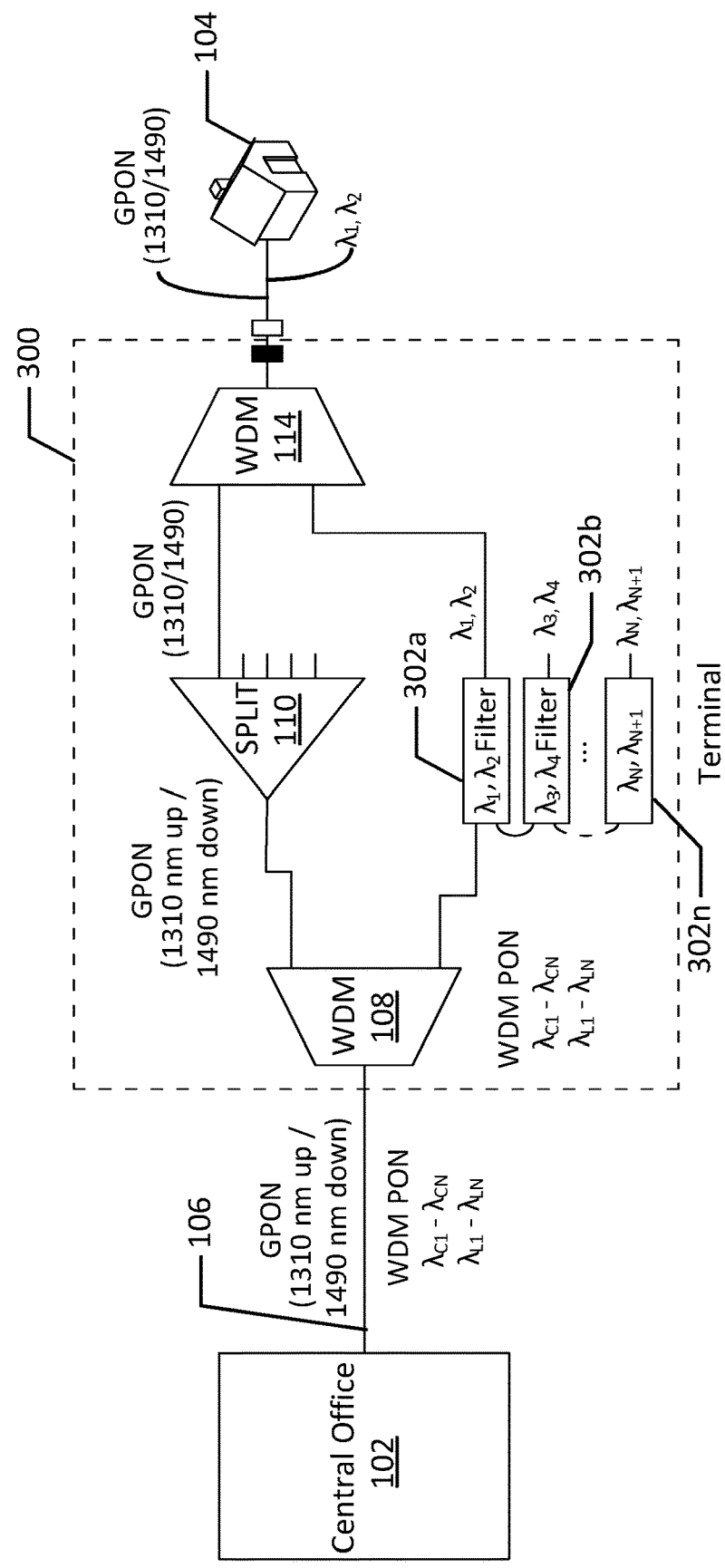
FIG. 8 shows a schematic view of a system for configurable delivery of selectable passive optical network services, according to a further embodiment of the present disclosure.

FIG. 8 illustrates a further variation of a system 300 for delivering passive optical network services to a subscriber 104. In system 300, a received combined signal on fiber 106 is routed to WDM 108, which separates GPON signals from WDM-PON signals as discussed above. The GPON signals are routed to 1×32 splitter 110, while the WDM-PON signals are routed to a filter array 302, which is illustrated as a plurality of filters 302*a-n* which each selectively pass a narrow band of wavelengths. As such, the filter array 302 operates as a wavelength division multiplexer that separates (or combines) an inbound wavelength onto separate "channels" that include both C-Band and L-Band wavelengths.

Such wavelength bands can be multiplexed with GPON signals at WDM 114 to deliver either GPON, WDM-PON, or combined services to a particular subscriber 104, thereby again avoiding the requirement of service at a particular subscriber to switch over to an "upgraded" WDM-PON service. In alternative embodiments, and analogous to those described above, a further variation of FIG. 8 would involve delivering WDM-PON and GPON services on separate fibers to the system 300, thereby removing the WDM 108.

Figure 9:
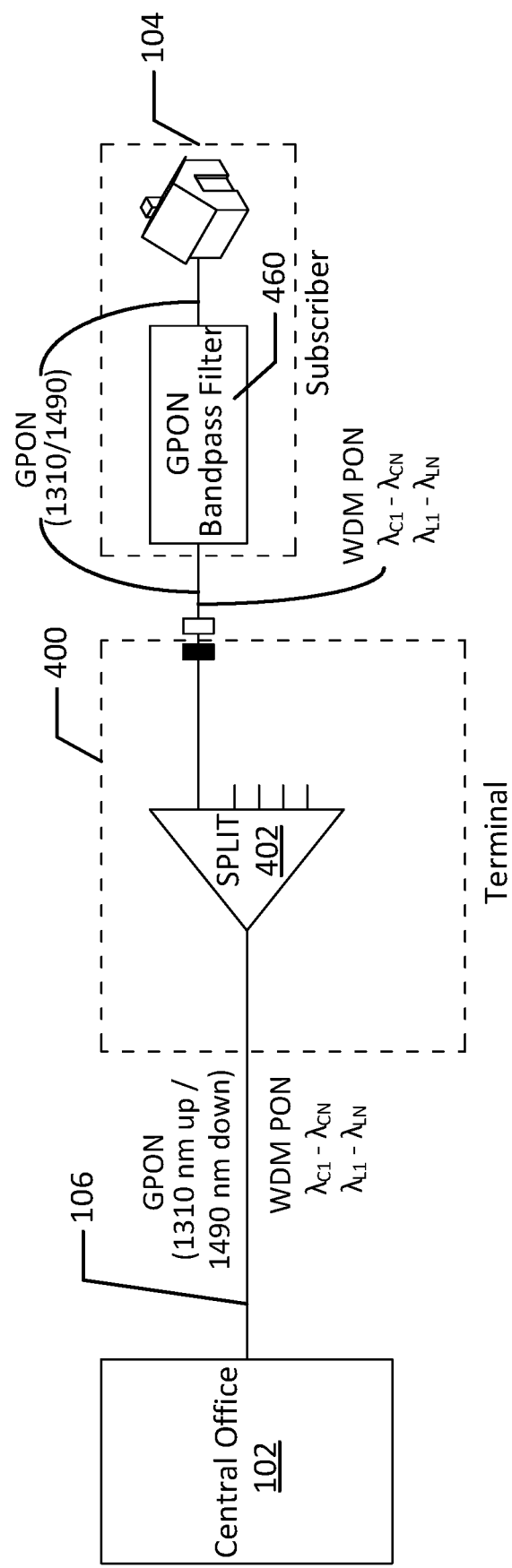
FIG. 9 shows a schematic view of a system for configurable delivery of GPON-based passive optical network services, according to a further embodiment of the present disclosure.
Figure 10:
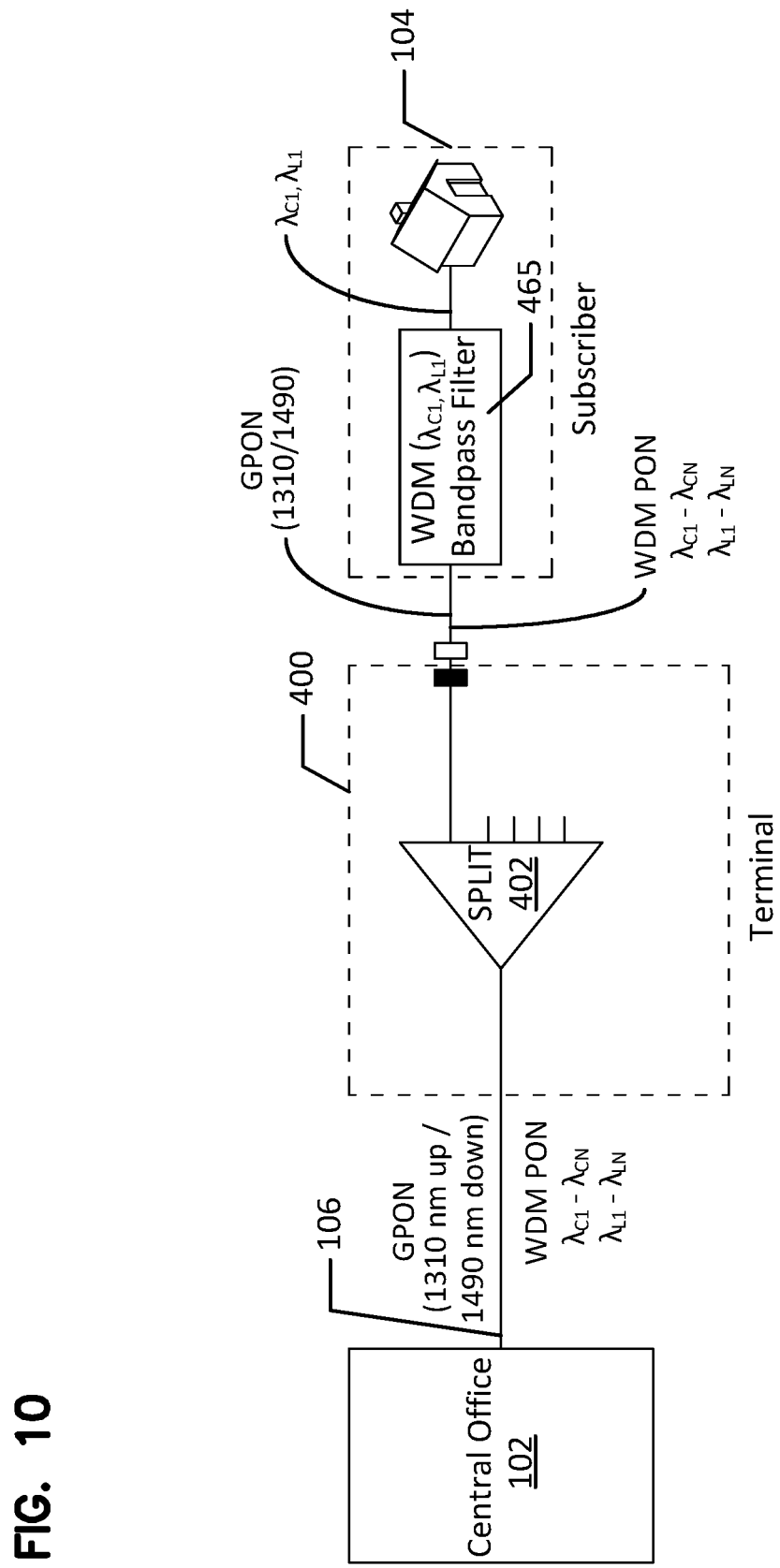
FIG. 10 shows a schematic view of a system for configurable delivery of WDM-based passive optical network services, according to a further embodiment of the present disclosure.

Referring to FIGS. 9-10, a further possible system 400 is shown, according to an example embodiment. In the example of FIG. 9, a system 400, such as an outside plant terminal, can receive combined GPON and WDM-PON services on an input fiber 106, and split that signal using splitter 402, which can be, in some embodiments, a 1×32 power splitter. Each output signal of that splitter, which retains the GPON and all WDM-PON wavelengths, would then be delivered to a subscriber. In the arrangement of FIG. 9, a GPON subscriber would include GPON equipment, including a GPON filter 460, at the subscriber premises, thereby filtering out all WDM-PON wavelengths (shown as C-band wavelengths $\lambda_{C1}$-$\lambda_{CN}$, and L-band wavelengths $\lambda_{L1}$-$\lambda_{LN}$). The subscriber would then also be configured to deliver GPON return signals, such as may be accomplished using any of the subscriber configurations illustrated in FIG. 4A or 5A.

By way of contrast to FIG. 9, in FIG. 10, a WDM band-pass filter 465 can be installed at the subscriber 104, such that the GPON and other non-selected WDM-PON wavelengths are filtered, and a particular set of C-band and L-band wavelengths (shown as $\lambda_{C1}$, $\lambda_{L1}$) are allowed to pass through for use by the subscriber 104.

In comparison to the arrangements of FIGS. 2-3 and 6-8, the arrangement of FIGS. 9-10 delivers all WDM-PON wavelengths to each subscriber, and therefore the filter 465 at each WDM-PON subscriber must be uniquely useable by that subscriber (e.g., physically keyed or otherwise uniquely identifiable) such that no two subscribers utilize the same downlink or uplink wavelengths to avoid collision of data from those subscribers (e.g., because in the WDM-PON case, no time division multiplexing is provided because it is presumed that the service is dedicated to a specific subscriber). Additionally, although the design at the system 400 of the terminal is simplified, other arrangements may be selected for other reasons. For example, the arrangement of FIGS. 9-10 may be disadvantaged for WDM-PON subscribers, since each of the WDM-PON signals is power-split at splitter 402. In the other arrangements discussed herein, WDM-PON signals are not power-split in this manner.

In each of the above cases, although some reconfiguration of equipment at a subscriber may be required, in the variety of example embodiments provided herein, little or no reconfiguration of connections at a terminal between a central office 102 and a subscriber 104 is required, thereby simplifying maintenance and/or configuration services that would otherwise be performed by a service provider. Furthermore, installation of new equipment at a subscriber could be performed either by providing a self-install kit to a subscriber or by installing an automatically or remotely configurable filter and/or transmission system that utilizes a tunable optical transmitter at the subscriber to vary the L-band (uplink) frequency that is used.

Overall, in each of the above-described situations, GPON subscribers can each utilize common equipment at the subscriber premises, since those subscribers will utilize the same uplink and downlink frequencies. However, as subscribers migrate to WDM-PON systems, those subscribers will receive dedicated wavelengths and will utilize a pre-configured or tunable system at assigned L-band and C-band (uplink and downlink) wavelengths. Such subscribers can be managed using a wavelength assignment or tracking system that validates that user's dedicated WDM-PON wavelength, for example using a tracking application.

In various examples of the present disclosure, delivery of gigabit passive optical networks and WDM passive optical networks are considered; however, deployment of additional types of optical networks is possible as well using the systems and techniques disclosed herein. For example the present disclosure also relates to delivery of other types of systems with different wavelengths and parallelism, such as various WDM-PON arrangements. Furthermore, other embodiments are possible as well which include different levels and combinations of splitters, filters, and wavelength division multiplexers. Examples of other variations are described in U.S. Pat. No. 8,559,818, the disclosure of which is hereby incorporated by reference in its entirety.

In the embodiments disclosed herein, the systems for delivery of multiple passive optical network services are illustrated as passive optical modules. However, it is understood that the system can be configured from a number of separate components, and could include additional passive or active optical components. Furthermore, additional optical networking components can be incorporated into networks having the systems described herein.

Additionally, it is noted that the uplink and downlink wavelengths can be configured in various ways. For example, in some embodiments (e.g., as discussed in connection with at least FIGS. 8-10, C-band and L-band wavelengths are adjacent one another, meaning that no other C-band or L-band wavelength assigned to a different subscriber of the subscribers connected to the terminal are provided between those wavelengths. In alternative arrangements in which an AWG is configured to route individual wavelengths or wavelength bands to a particular output, various wavelength combinations may be used, which may or may not be adjacent. This is also the case if, on uplink, the GPON services are used, with a non-dedicated uplink channel.

Through use of the systems disclosed herein, a provider of passive optical network services can connect multiple services to a single subscriber location while avoiding laying additional fibers to those locations. A provider or maintainer of an optical network such as are disclosed herein can install the splitters, filters, and wavelength division multiplexers as described herein to split a common wavelength pair into a number of fibers, and to separate unique wavelength pairs onto a corresponding number of fibers. The fibers carrying the common wavelength pair can be joined to each one of the fibers carrying different unique wavelength pairs to allow connection of a subscriber to either one or both services by using a single preexisting optical fiber connected to the subscriber.

Figure 11A:
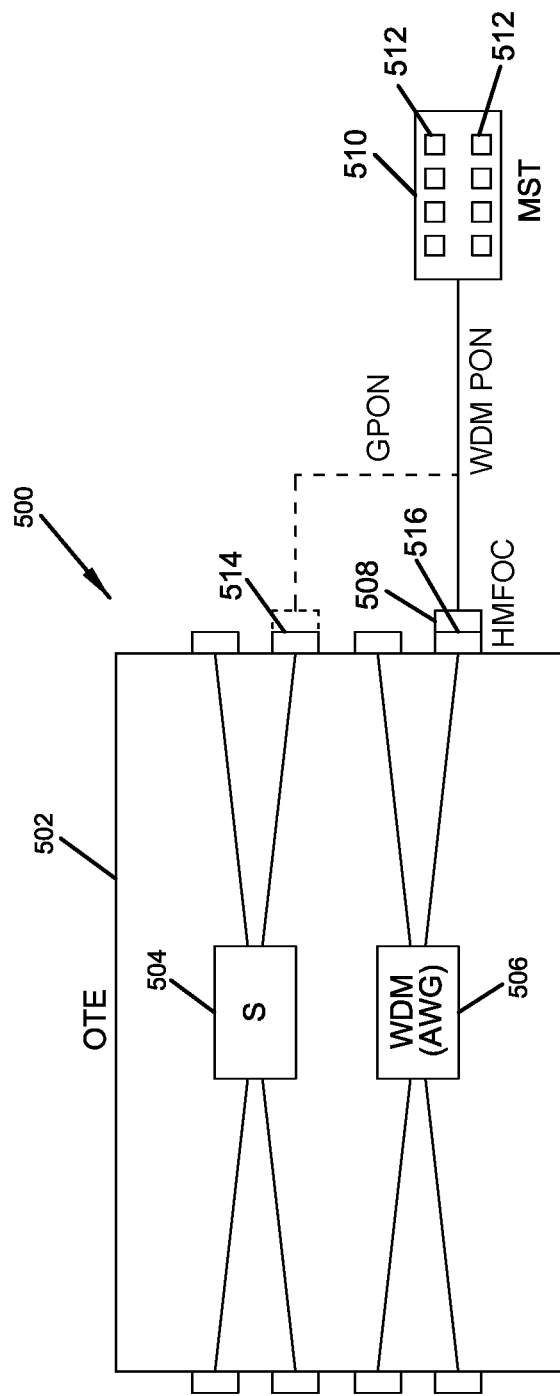
FIGS. 11A-11C schematically illustrate a variety of different fiber deployment configurations for delivering WDM-based passive optical network services according to the present disclosure.
Figure 11B:
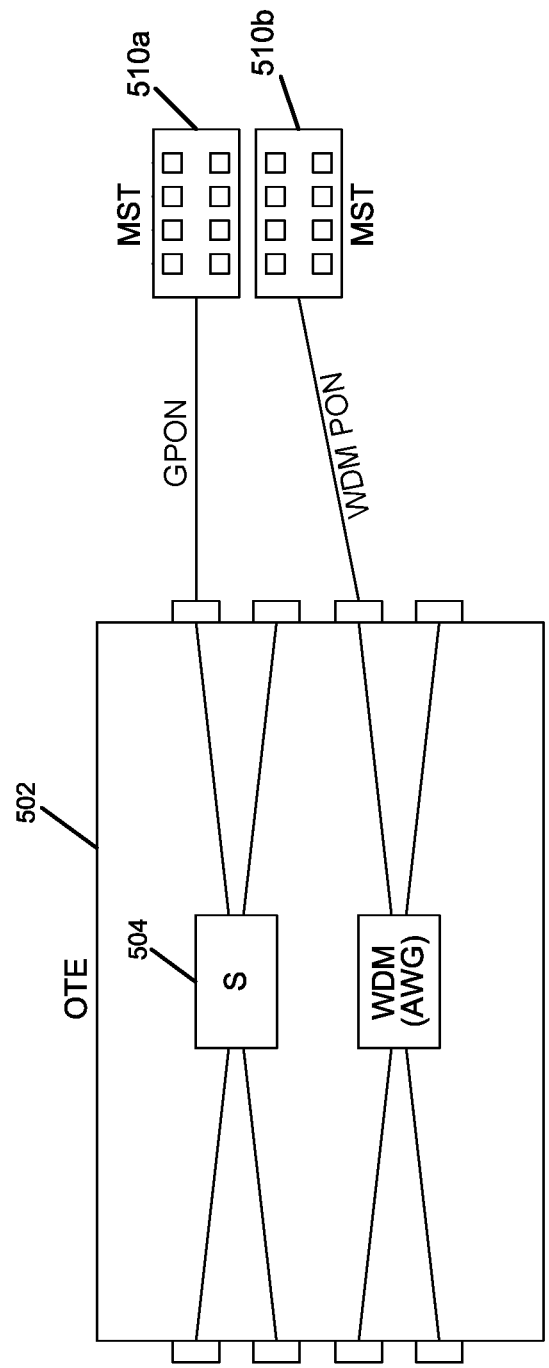
Figure 11C:
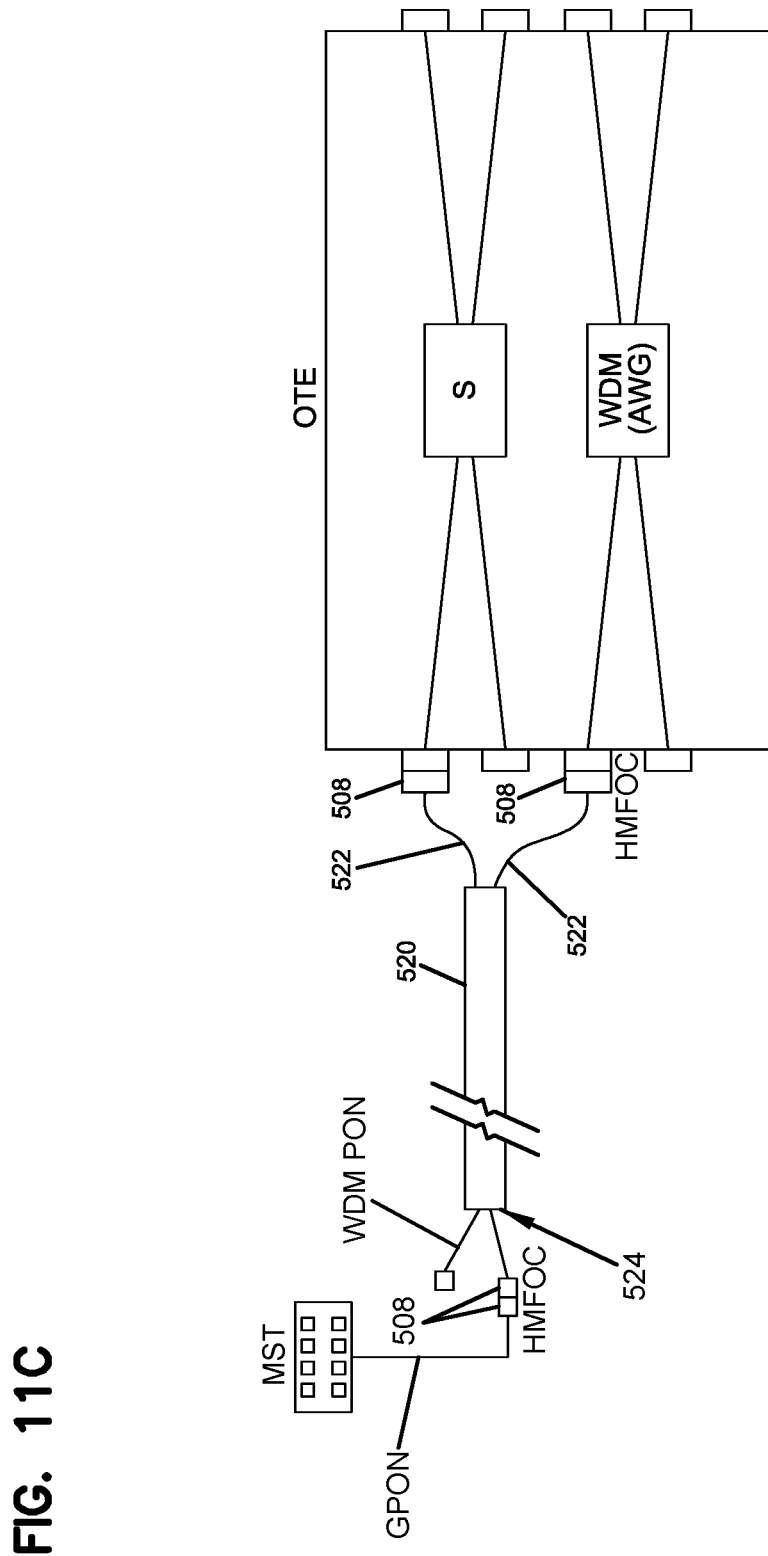

Referring now to FIGS. 11A-11C, a variety of fiber deployment configurations for delivering WDM-based passive optical network services according to the present disclosure are schematically illustrated. The systems illustrated in FIGS. 11A-11C allow for convenient switchover of individual customers/subscribers from a GPON network to a WDM-based PON network. FIGS. 11A-11C relate to configurations or systems where the switchover includes a change of the physical connection at a terminal located between a source such as the central office and a subscriber location. In contrast, the systems described above may include additional components at the terminal locations to allow the subscribers to change between GPON and WDM-PON services without a physical connection change at the terminal.

According to the configuration illustrated in FIG. 11A, an outside equipment enclosure, depicted in the form of an optical termination enclosure (OTE) 502, may receive a distribution fiber leading from a source such as a central office including both GPON services (e.g., operating on 1310 nm uplink and 1490 downlink optical frequencies) as well as a spectrum useable for WDM-based PON distribution (or separate fibers for the GPON and WDM-PON services as shown above). According to the example deployment system 500 illustrated in FIG. 11A, the depicted OTE 502 includes a splitter 504 (e.g., 1×32) for power splitting the GPON signal. The WDM-based PON wavelengths are routed to a cyclic arrayed waveguide grating (AWG) 506 in the OTE 502 that operates as a WDM to split dedicated pairs of uplink and downlink wavelengths ($\lambda_C$, $\lambda_L$, respectively) onto separate fibers.

The OTE 502, as depicted, may output GPON and WDM-PON signals through connectors such as hardened multi-fiber optic connectors (HMFOC) 508 leading to further outside equipment enclosures such as multiport service terminals (MST) 510 servicing a number of subscribers. In the depicted embodiment, each MST 510 is shown with eight ports 512 for servicing eight subscribers.

According to the switchover configuration illustrated in FIG. 11A, an MST location may receive an upgraded WDM-PON signal by unplugging connectorized cabling from a GPON based output 514 and plugging the connectorized cabling into a WDM-PON based output 516 at the OTE location.

FIG. 11B illustrates a variation of the switchover configuration shown in FIG. 11A, wherein two MST's 510a, 510b, one dedicated to GPON-based service and one dedicated to WDM-PON service, respectively, are deployed in the field. Subscribers desiring a service upgrade are switched from the GPON dedicated MST 510a to the WDM-PON dedicated MST 510b. In this configuration, if a single subscriber wants to upgrade its service, the entire MST location does not have to be switched over to the WDM-PON based signal and the subscriber can be independently upgraded.

When all of the subscribers/customers of the GPON dedicated MST 510a have switched over the WDM-PON dedicated MST 510b, the now "empty" MST 510a can be used for future service upgrades. For example, the "empty" MST 510a can now be used for a different signal such as a 10 Gbps data line if the equipment at the OTE 502 is also upgraded accordingly (e.g., the splitter 504 removed and replaced by other WDM-type equipment that can split the required uplink and downlink wavelengths onto separate fibers). Thus, the already existing, but empty, MST's can now be used to provide convenient signal upgrade switchovers with equipment changes only at the OTE location.

FIG. 11C illustrates a variation of the configurations of FIGS. 11A and 11B, wherein a cable 520 carrying both GPON and WDM-PON based signals are initially deployed, ready for future signal switchovers. The fibers 522 of the cable can be terminated with HMFOC's 508 at both ends. The remote end 524 of the cable 520 can be used for either of the switchover methods described in FIG. 11A (one MST switched over) or 11B (dedicated MST's for each of the type of signals).

Figure 12:
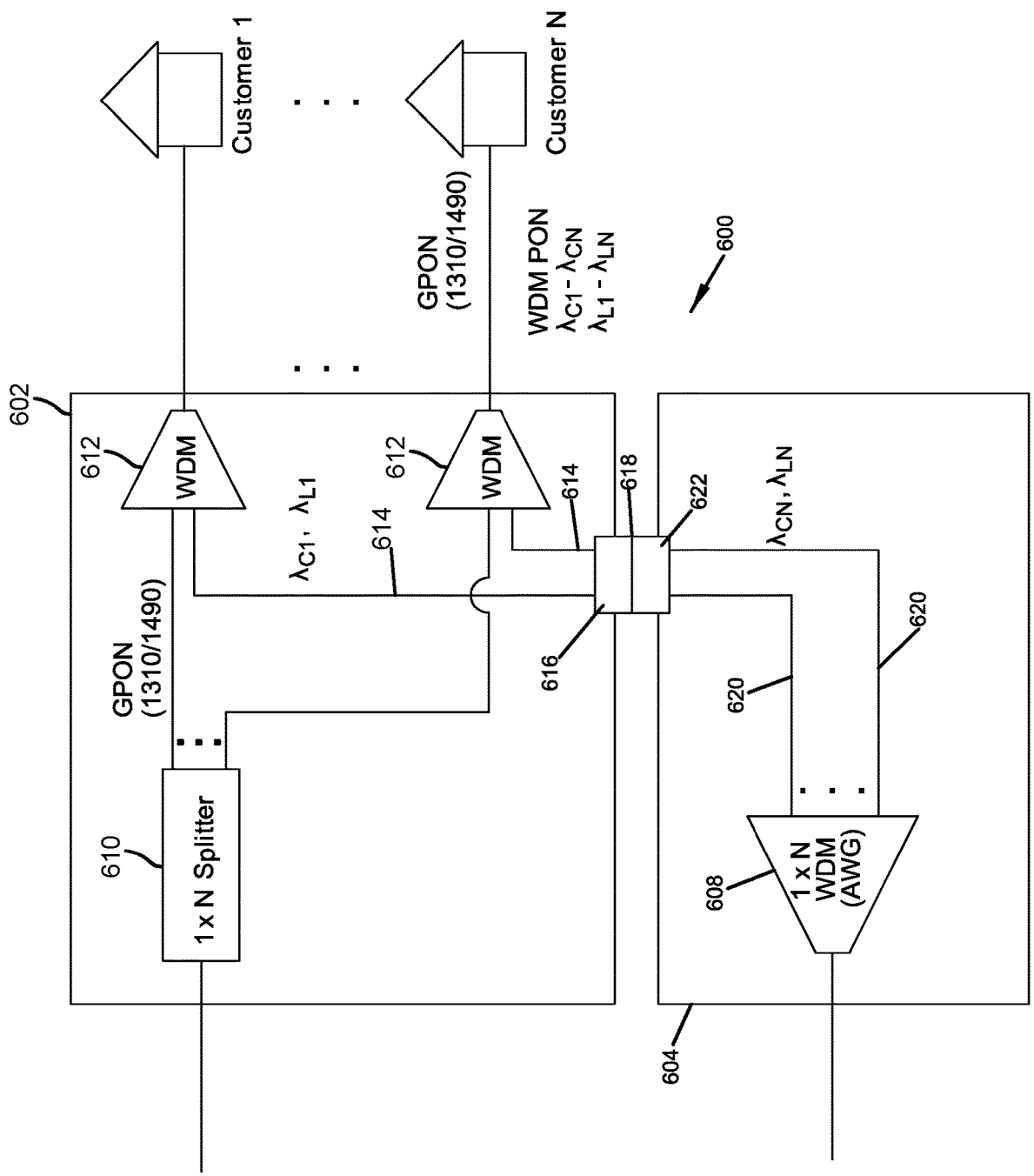
FIG. 12 schematically illustrates an example method and system for providing deferred delivery of WDM-based passive optical network services according to the present disclosure.

FIG. 12 illustrates a system 600 that is a variation of the systems 100, 150 described above with respect to FIGS. 2 and 3. The system 600 of FIG. 12 illustrates a method for deferred delivery of WDM-based passive optical network services according to the present disclosure.

Even though the system 600 of FIG. 12 is configured for connecting optical fibers from a source, such as a central office or OLT, to one or more subscribers, such as customers or ONT connections, the system 600 of FIG. 12 is set up to defer the WDM-based PON service until a future desired time for the subscribers.

Similar to FIG. 3, the system 600 of FIG. 12 may receive separate fibers 606a, 606b for the GPON and WDM-PON services, respectively. However, the GPON and the WDM-PON services may be housed in separate housings 602, 604, respectively, and the WDM-PON services may not be fully incorporated into the system 600 until the two separate housings are physically connected. According to one example embodiment, the housing 604 carrying the AWG 608, which operates as a WDM to split uplink and downlink wavelengths onto separate fibers may be provided a piece of modular equipment that may need to be physically connected to the housing 602 carrying the power splitter.

In the specific system 600 shown in FIG. 12, the GPON wavelengths are routed to a splitter 610, which power-splits the GPON signal up to n ways (one per subscriber). There are n number of WDM's 612 housed within the same housing 602. As described above with respect to the systems of FIGS. 2 and 3, the WDM's 612 are configured to combine an output from the power splitter 610 with a WDM wavelength pair. However, the fibers 614 carrying the WDM wavelength pairs are not relayed directly from the AWG 608. The fibers 614 carrying the WDM wavelength pairs are patched to a first connector 616 that has a connection location 618 exposed to an exterior of the housing 602 carrying the power splitter 610 and the WDM's 612. The first connector 616 may be provided as a multi-fiber connector (MPO). Other connectors may also be used.

Similarly, fibers 620 carrying the WDM wavelength pairs that have been split by the AWG 608 are also patched to a second connector 622 that is configured to mate with the first connector 616 when the two housings 602, 604 are mated. The second connector 622 may also be an MPO connector. Other connectors that are configured to mate with the first connector can also be used.

In this manner, a shared signal being forwarded to a subscriber can be upgraded to a combined GPON and WDM-PON signal by a modular connection provided between the two housings 602, 604 when the upgrade is desired.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for delivering multiple passive optical network services comprising:
   a first optical transmission service comprising a common wavelength pair routed from a source to each of a plurality of subscribers;
   a second optical transmission service comprising a plurality of unique wavelength pairs, each of the unique wavelength pairs assigned to a subscriber among the plurality of subscribers;
   a first housing having a first connector;
   a splitter positioned within the first housing and optically connected to a first fiber carrying the first optical transmission service, the splitter including a plurality of outputs each delivering the first optical transmission service;

a second housing having a second connector;

a wavelength division multiplexer positioned within the second housing and optically connected to a second fiber, the wavelength division multiplexer separating each of the unique wavelength pairs of the second optical transmission service onto separate optical fibers;

a plurality of second wavelength division multiplexers optically connected to a different output of the plurality of outputs of the splitter and to a different one of the unique wavelength pairs from the wavelength division multiplexer via an optical connection between the first connector and the second connector, thereby combining a unique wavelength pair and a common wavelength pair onto a single fiber to be delivered to a subscriber.

2. The system of claim 1, wherein the wavelength division multiplexer comprises an arrayed waveguide grating.

3. The system of claim 1, further comprising a third wavelength division multiplexer optically connected to a fiber received from the central office carrying the common wavelength pair and the plurality of unique wavelength pairs, the third wavelength division multiplexer separating the common wavelength pair from the plurality of unique wavelength pairs.

4. The system of claim 1, wherein the splitter comprises a 1:32 splitter.

5. The system of claim 1, wherein the common wavelength pair is received on a first fiber from a central office and wherein the plurality of unique wavelength pairs is received on a second fiber from the central office.

6. The system of claim 1, wherein the plurality of second wavelength division multiplexers includes one or more six-port wavelength division multiplexers.

7. The system of claim 1, wherein each of the unique wavelength pairs includes an uplink wavelength and a downlink wavelength, wherein the uplink wavelength and the downlink wavelength are adjacent to each other.

8. The system of claim 7, wherein the band-pass filter is located at a subscriber and delivers the unique wavelength pair to the subscriber in the absence of delivering the common wavelength pair.

9. The system of claim 7, wherein the band-pass filter is located at a subscriber and delivers the common wavelength pair to the subscriber in the absence of delivering the unique wavelength pair.

10. The system of claim 1, wherein the connector comprises a multi-fiber connector.

11. The system of claim 1, wherein the second connector of the second housing receives the separate optical fibers at a multi-fiber connector.

12. A method of delivering multiple passive optical network services comprising:

receiving, at a first housing, a first optical transmission service comprising a common wavelength pair routed from a source to each of a plurality of subscribers;

receiving, at a second housing, a second optical transmission service comprising a plurality of unique wavelength pairs, each of the unique wavelength pairs assigned to a subscriber among the plurality of subscribers;

splitting, at a splitter positioned within the first housing, the first optical transmission service onto a plurality of outputs;

separating, at a wavelength division multiplexer within the second housing, each of the unique wavelength pairs of the second optical transmission service onto separate optical fibers;

physically connecting the second housing to the first housing to rejoin the separate optical fibers to the first housing; and joining, on a single output fiber to be delivered to a subscriber, a unique wavelength pair and a common wavelength pair.

13. The method of claim 12, wherein joining the unique wavelength pair and the common wavelength pair onto a single output fiber comprises connecting the unique wavelength pair and the common wavelength pair to a second wavelength division multiplexer within the first housing.

14. The method of claim 12, wherein physically connecting the second housing of the first housing includes optically connecting a first connector of the first housing to a second connector of the second housing.

15. The method of claim 14, wherein the second connector of the second housing receives the separate optical fibers at a multi-fiber connector.

16. The method of claim 14, wherein the first housing is installed at an outside plant terminal.

17. The method of claim 16, wherein physically connecting the second housing to the first housing occurs after installation of the first housing at the outside plant terminal.

* * * * *